(12) United States Patent
Novak et al.

(10) Patent No.: US 12,511,309 B2
(45) Date of Patent: Dec. 30, 2025

(54) KEEPING STABLE LEADERSHIP IN RAFT-BASED PROTOCOL WITH FAST AUTOMATIC FAILOVER

(71) Applicant: Oracle International Corporation, Redwood Shores, CA (US)

(72) Inventors: Leonid Novak, Castro Valley, CA (US); Lik Wong, Palo Alto, CA (US); Sampanna Salunke, San Carlos, CA (US)

(73) Assignee: Oracle International Corporation, Redwood Shores, CA (US)

( * ) Notice: Subject to any disclaimer, the term of this patent is extended or adjusted under 35 U.S.C. 154(b) by 0 days.

(21) Appl. No.: 18/227,288

(22) Filed: Jul. 27, 2023

(65) Prior Publication Data

US 2024/0134879 A1 Apr. 25, 2024

Related U.S. Application Data

(60) Provisional application No. 63/415,468, filed on Oct. 12, 2022.

(51) Int. Cl.
*G06F 16/27* (2019.01)
(52) U.S. Cl.
CPC .................... *G06F 16/27* (2019.01)
(58) Field of Classification Search
CPC .................................................. G06F 16/27
(Continued)

(56) References Cited

U.S. PATENT DOCUMENTS 10,810,093 B1 * 10/2020 Tucek .................... H04L 41/30
10,936,573 B2    3/2021 Ducott
(Continued)

FOREIGN PATENT DOCUMENTS

EP           1876788 A1    1/2008
EP           3182300 A1    6/2017
WO   WO 2021/021757 A1    2/2021

OTHER PUBLICATIONS

Wong, U.S. Appl. No. 18/372,006, filed Sep. 22, 2023, Notice of Allowance and Fees Due.

(Continued)

*Primary Examiner* — Joshua Bullock
(74) *Attorney, Agent, or Firm* — Hickman Becker Bingham Ledesma LLP

(57) ABSTRACT

A node within a group of participant nodes begins an election by sending a vote request to the other nodes in the group. The vote request sets an input term argument to a future term value without incrementing the actual current term value. The current term value at each participant node is only incremented in response to a successful leadership change. At startup time, a candidate node issues a vote request with a non-disruptive election type. An established leader automatically rejects a non-disruptive vote request. A heartbeat loss vote request is rejected by each receiving node if its own heartbeat timeout does not exceed a predetermined limit. A mandatory vote request informs the leader node that it should stop requesting new workload. This is used in manual leadership transition to make sure that the old leader does not accept new transactions during the leadership transition.

20 Claims, 6 Drawing Sheets

(58) Field of Classification Search
USPC .......................................................... 707/624
See application file for complete search history.

(56) References Cited

U.S. PATENT DOCUMENTS

| | | | |
|---|---|---|---|
| 11,119,872 B1* | 9/2021 | Jacobson | G06F 11/202 |
| 11,671,488 B1* | 6/2023 | Sharma | G06F 16/182 709/223 |
| 2004/0243558 A1 | 12/2004 | Nelson | |
| 2005/0165858 A1 | 7/2005 | Tom et al. | |
| 2010/0145909 A1 | 6/2010 | Ngo | |
| 2013/0006933 A1 | 1/2013 | Holden | |
| 2013/0290249 A1 | 10/2013 | Merriman et al. | |
| 2014/0337529 A1 | 11/2014 | Antony | |
| 2016/0371358 A1 | 12/2016 | Lee | |
| 2017/0103092 A1 | 4/2017 | Hu et al. | |
| 2019/0155705 A1 | 5/2019 | Chavan | |
| 2019/0163545 A1 | 5/2019 | Singh et al. | |
| 2019/0325055 A1 | 10/2019 | Lee et al. | |
| 2020/0034257 A1 | 1/2020 | Mahmood et al. | |
| 2020/0042410 A1* | 2/2020 | Gupta | H04L 67/1097 |
| 2020/0364239 A1 | 11/2020 | Kumar | |
| 2022/0100710 A1 | 3/2022 | Camargos et al. | |
| 2022/0114058 A1 | 4/2022 | Mylavarapu et al. | |
| 2022/0114164 A1 | 4/2022 | Krishnaswamy et al. | |
| 2022/0206900 A1* | 6/2022 | Zad Tootaghaj | G06F 9/5077 |
| 2022/0358118 A1* | 11/2022 | Paluch | H04L 41/30 |
| 2024/0012575 A1* | 1/2024 | Narasingarayanapeta | G06F 3/0647 |
| 2024/0036732 A1* | 2/2024 | Vijayan | G06F 3/0614 |
| 2024/0036996 A1* | 2/2024 | Vijayan | G06F 11/2012 |
| 2024/0036997 A1* | 2/2024 | Vijayan | G06F 11/0772 |
| 2024/0045887 A1 | 2/2024 | VanBenschoten | |
| 2024/0143554 A1* | 5/2024 | Kaushik | G06F 3/0611 |
| 2024/0256391 A1* | 8/2024 | Shetty | G06F 3/067 |
| 2024/0256405 A1* | 8/2024 | Shetty | G06F 11/2023 |
| 2024/0273077 A1* | 8/2024 | Zeng | G06F 16/2282 |
| 2024/0311170 A1* | 9/2024 | Rogers | G06F 9/45558 |

OTHER PUBLICATIONS

Wong, U.S. Appl. No. 18/372,005, filed Sep. 22, 2023, Notice of Allowance and Fees Due.
Wong, U.S. Appl. No. 18/372,005, filed Sep. 22, 2023, Non-Final Rejection.
Wong, U.S. Appl. No. 18/372,002, filed Sep. 22, 2023, Notice of Allowance and Fees Due.
Ongaro et al., "In Search of an Understandable Consensus Algorithm", Jun. 19, 2014, pp. 1-16.
International Searching Authority, "International Search Report and Written Opinion", in International Application No. PCT/US2023/034464 dated Jan. 3, 2024, pp. 14.
International Searching Authority, "International Search Report and Written Opinion", in International Application No. PCT/US 2023/034465 dated Jan. 9, 2024, pp. 13.
Cao et al., "PolarDB-X: An Elastic Distributed Relational Database for Cloud-Native Applications", 2022 IEEE 38th ICDE, pp. 1-14.

* cited by examiner

KEEPING STABLE LEADERSHIP IN RAFT-BASED PROTOCOL WITH FAST AUTOMATIC FAILOVER

CROSS-REFERENCE TO RELATED APPLICATIONS; BENEFIT CLAIM

This application claims the benefit of Provisional Application 63/415,468, filed Oct. 12, 2022, the entire contents of which are hereby incorporated by reference as if fully set forth herein, under 35 U.S.C. § 119(e).

FIELD OF THE INVENTION

The present invention relates to keeping stable leadership in Raft-based protocol with fast, automatic failover, and more specifically to keeping stable leadership in Raft-based protocol for zero data loss replication in a sharded database with fast, automatic failover, strong consistency, full relational SQL, and transaction support.

BACKGROUND

Consensus protocols allow a collection of machines to work as a coherent group that can survive the failures of some of its members. Because of this, variations of consensus protocols play a key role in large-scale software systems, such as replicated database systems. Raft is a consensus protocol that is designed to be understandable and simple to implement. Raft offers a generic way to distribute a state machine across a cluster of computing nodes, referred to herein as simply "nodes" or "participant nodes," ensuring that each node in the cluster agrees upon the same series of state transitions. The replicated state machines are typically implemented using a replicated log. Each node stores a log replica containing a series of commands, which its state machine executes in order; thus, each state machine processes the same sequence of commands. Since the state machines are deterministic, each computes the same state and the same sequence of outputs.

Sharding is a database scaling technique based on horizontal partitioning of data across multiple independent physical databases. Each physical database in such a configuration is called a "shard." Sharding relies on replication for availability. Database sharding customers often require a high performance, low overhead replication that gives strong consistency and supports fast failover with zero data loss, full Structured Query Language (SQL), and relational transactions. The replication must support virtually unlimited horizontal scalability. There are Raft implementations for database replication to attempt to address the above requirements, such as the MongoDB® database system, Cloud Spanner™ cloud software, the CockRoachDB™ database system, YugabyteDB, TiDB, and Oracle® Native Database Blockchain (NDB).

A common problem in Raft is unnecessary leadership changes. False failovers disrupt user workload and impact replication efficiency. The Raft protocol dictates that only the peer with the most advanced logs can become a leader, which reduces leadership flipping. However, the Raft protocol does not address leadership changes due to unpredictable real-world issues, such as intermittent network communication, heartbeat loss, network communication cost that is not related to network latency, and multiple peers starting up in a short span. The MongoDB® database system uses a pre-vote phase and heartbeat timeout-related heuristics to keep leadership sticky.

In the Raft protocol, time is divided into terms of arbitrary length. Each term begins with an election in which one or more candidate nodes attempt to become leader. After a successful election, a single leader manages the cluster until the end of the term. Some elections fail, in which case, the term ends without choosing a new leader. A node increments the leadership term at the beginning of an election and cannot reestablish itself as the follower for the previous term. If multiple candidates start voting and there is a high and variable network execution cost that is not related to latency, then the candidates may vote for themselves. In the Raft protocol, each candidate backs off, increases the term, and starts the election with a randomized timeout. Both candidates may vote for themselves again in the next leadership term. As a result, multiple candidates may contend for leadership for successive leadership terms, with none of them winning, leading to term inflation. Term inflation may occur for an extended period of time in which there is no leadership, and thus no replication. Frequent bouts of term inflation can severely degrade the performance of systems that the use the Raft protocol because in-flight transactions in the current leader may get errored and no user workload can be submitted without a new leader.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section. Further, it should not be assumed that any of the approaches described in this section are well-understood, routine, or conventional merely by virtue of their inclusion in this section.

DETAILED DESCRIPTION

Figure 1:
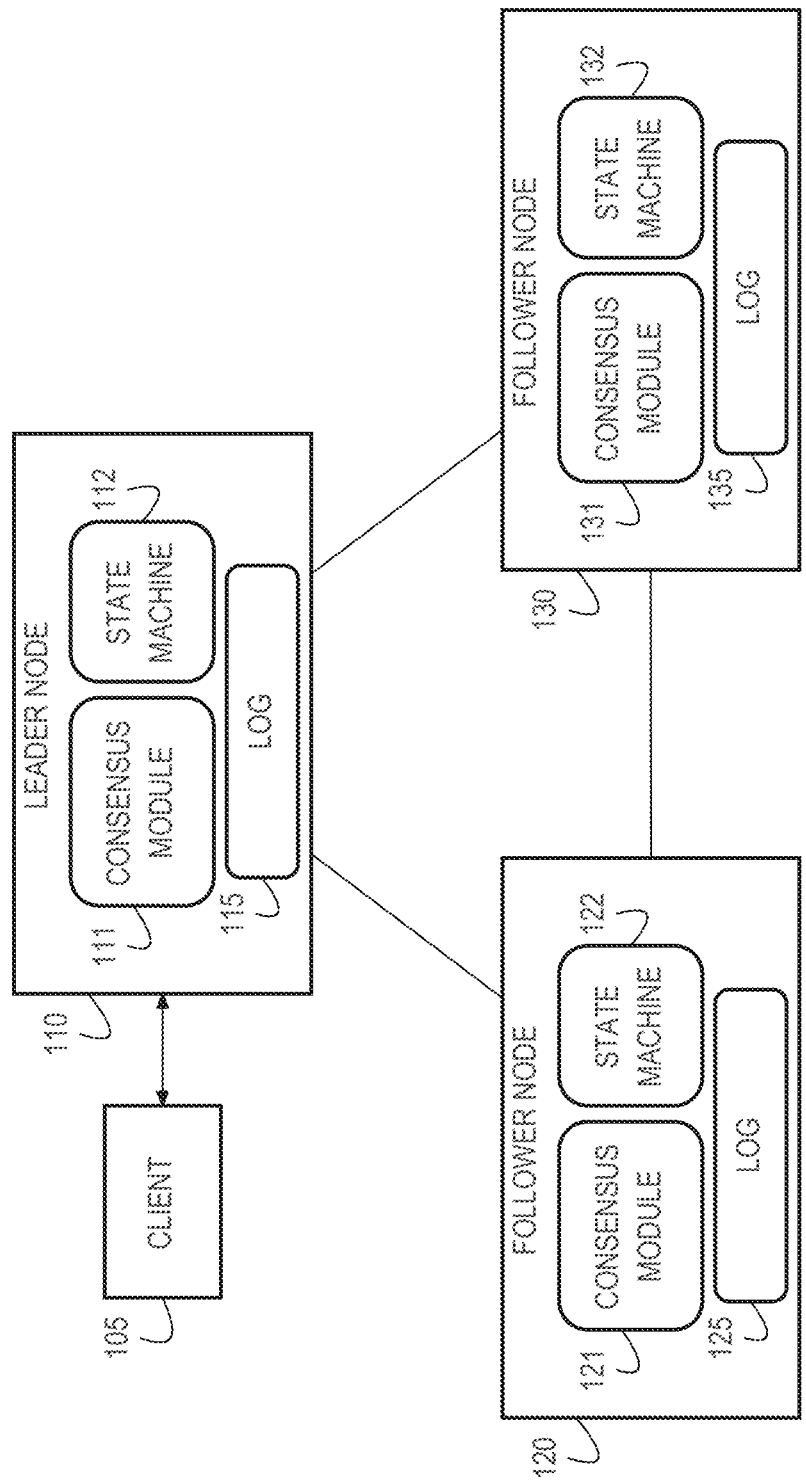
FIG. 1 is a block diagram illustrating a distributed computing system with a state machine and log replicated across a plurality of computing nodes in accordance with a consensus protocol in which aspects of the illustrative embodiments may be implemented.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

The illustrative embodiments provide improvements to consensus protocols to avoid term inflation and to provide stable leadership. In some embodiments the consensus protocols are implemented in a replicated database management system (DBMS), such as a sharded database system. In accordance with the illustrative embodiments, a node begins an election by sending a vote request to the other nodes in the group, where the vote request sets an input term argument to a future term value rather than a current term value. According to a consensus protocol, the current term value is set at each node to the latest term value the node has seen. Accordingly, to accept a vote, the receiving nodes compare their local current term value to the input term of the vote request, which is set to the future term rather than the candidate's current term. The future term value provides a value to compare to the local current term at the receiving node without incrementing the actual current term value. Thus, the current term value at the candidate node is only incremented in response to a successful leadership change. Furthermore, because the candidate node passes an input term argument rather than the term argument in the vote request, the vote request does not trigger a node receiving the vote request to advance its local current term. If the vote is successful, then the candidate will convert to leader and subsequently send an RPC with a term argument set to the new leader's current term value. The follower nodes receiving this RPC will then update their local current term values to the value of the term argument of the RPC. Therefore, all nodes advance their current term values only when there is a successful leadership change, thus avoiding term inflation.

Stable leadership minimizes disruption to user workload and improves replication efficiency. In some embodiments, the vote request includes an election type. At startup time, to avoid a race condition, a node issues a vote request with a non-disruptive election type. Thus, at startup of a new participant node, before an established leader has managed to connect to the new node and convert the new node to follower, the new node may immediately initiate an election with a non-disruptive vote request. Any established leader automatically rejects a non-disruptive vote request. Therefore, a non-disruptive vote request will only result in the new node becoming a leader if there are no established leaders or followers. This avoids term inflation and unnecessary leadership changes.

In some embodiments, a heartbeat loss vote request is rejected by the leader or any other follower if its own heartbeat timeout does not exceed a predetermined limit. In other words, if a given follower node has received a heartbeat from the leader and there is another node that requests leadership, the given node rejects the vote request on the premise of being a party of established consensus. In other words, if the leader node has sent a heartbeat to enough follower nodes to establish consensus, then a leadership change is unnecessary.

Furthermore, in some embodiments, a mandatory vote request informs the leader node that it should stop requesting new workload. This is used in manual leadership transition or load balancing to make sure the old leader does not accept new transactions during the leadership transition to allow the candidate node to bring its log up to date. Once the candidate node receives all log records from the previous leader, the leadership transition occurs.

Raft Protocol

Raft is a consensus protocol for managing a replicated log. To enhance understandability, Raft separates the key elements of consensus, such as leader election, log replication, and safety, and enforces a stronger degree of coherency to reduce the number of states that must be considered. FIG. 1 is a block diagram illustrating a distributed computing system with a state machine and log replicated across a plurality of computing nodes in accordance with a consensus protocol in which aspects of the illustrative embodiments may be implemented. In the example shown in FIG. 1, there is a leader node 110 and two follower nodes 120, 130; however, the distributed computing system can include other numbers of nodes depending on the configuration or workload. For example, the number of nodes in the group of participant nodes can be scaled up or down depending on the workload or other factors that affect resource usage. Consensus protocols typically arise in the context of replicated state machines. As shown in FIG. 1, state machines 112, 122, 132 are replicated across a group of computing nodes 110, 120, 130, respectively. State machines 112, 122, 132 operate to compute the same state and continue to operate even if one or more of the computing nodes 110, 120, 130 are down.

Replicated state machines are implemented using replicated logs. Each node 110, 120, 130 stores a log 115, 125, 135, respectively, containing a series of commands that are executed in order by its state machine 112, 122, 132. Each log should contain the same commands in the same order, so each state machine will process the same sequence of commands. Because the state machines 112, 122, 132 are deterministic, each computes the same state and the same sequence of outputs.

Keeping the replicated log consistent is the purpose of the consensus protocol. The consensus module 111 on a leader node 110 receives commands from clients, such as client 105, and adds them to its log 115. The consensus module 111 of leader node 110 communicates with the consensus modules 121, 131 of the follower nodes 120, 130 to ensure that their logs 125, 135 eventually contain the same requests or commands in the same order, even if one or more nodes fail. Once commands are properly replicated, each node's state machine processes them in log order, and the outputs are returned to client 105. As a result, the nodes 110, 120, 130 appear to form a single, highly reliable state machine.

A Raft cluster or group contains several nodes, such as servers. For example, a typical Raft group may include five nodes, which allows the system to tolerate two failures. At any given time, each server is in one of three states: leader, follower, or candidate. In normal operation, there is exactly one leader, and all other participant nodes are followers. Followers are passive and issue no requests on their own; followers simply respond to requests from leaders and candidates. The leader handles all client requests. If a client contacts a follower, the follower redirects it to the leader. The third state, candidate, is used to elect a new leader.

The Raft protocol divides time into leadership terms of arbitrary length. Terms are numbered with integers. Each term begins with an election, in which one or more candidates attempt to become leader. Different nodes observe the transitions between leadership terms at different times, and in some situations a node may not observe an election or even entire terms. In the Raft protocol, terms act as a logical clock, and they allow nodes to detect obsolete information, such as stale leaders. Each node stores a currentTerm number, which increases monotonically over time. Current terms are exchanged whenever nodes communicate; if one node's currentTerm value is smaller than another's, then it updates its currentTerm to the larger value. If a candidate or leader discovers that its current term is out of date, then it immediately reverts to the follower state. If a node receives a request with a stale term number, it rejects the request.

Raft nodes communicate using remote procedure calls (RPCs), and the consensus protocol requires only two types of RPCs. RequestVote RPCs are initiated by candidates during elections, and AppendEntries RPCs are initiated by leaders to replicate log entries and provide a form of heartbeat. In the Raft protocol, RPCs include a term value as an argument. Any RPC with a term value that is less than the receiving node's currentTerm is rejected. This ensures that only AppendEntries RPCs from the current leader are accepted in the current term.

Raft uses a heartbeat mechanism to trigger a leader election. When nodes start up, they begin as followers. A node remains in follower state as long as it receives valid RPCs from a leader or candidate. Leaders send periodic heartbeats (e.g., AppendEntries RPCs that carry no log entries) to all followers to maintain their authority. If a follower receives no communication over a period of time, then it assumes there is no viable leader and begins an election to choose a new leader. A candidate wins an election if it receives votes from a majority, or consensus, of the nodes in the full group for the same term. The majority rule ensures that at most one candidate can win the election for a particular term. Once a candidate wins an election, it becomes leader. It then sends heartbeat messages to the other nodes to establish its authority and prevent new elections.

Raft Protocol in a Replicated DBMS

The Raft consensus protocol is described herein with respect to a cluster or group of computing nodes, such as servers. In the context of a replicated DBMS, the Raft consensus protocol is applied to replicate a log of commands that is to be executed by the state machines of database servers to apply changes to a database. Changes to be applied to a database by a leader database server (e.g., a leader shard in a sharded database system) are recorded in a log at the leader database server and replicated to one or more follower database servers. In turn, each follower database server receives the commands in its log and applies the changes, in order, using its state machine, to a respective replica of the database.

In a replicated DBMS implementation, the leader node intercepts changes (e.g., data manipulation language (DML) commands, piecewise large object (LOB) updates, JavaScript™ object notation (JSON) inserts and updates) as logical change records (LCRs). The leader node constructs Raft log records based on the LCRs, which are replicated to follower database servers.

As an example of a specific implementation of a replicated DBMS, sharding distributes segments of a data set across many database servers on different computers (nodes). Sharding is a data tier architecture in which data is horizontally partitioned across independent database servers. Each database server is hosted on a dedicated computing node with its own local resources. Each database server in such a configuration is referred to as a "shard." All of the shards together make up a single logical database, which is referred to as a sharded database (SDB). In some embodiments, horizontal partitioning involves splitting a database table across shards so that each shard contains the table with the same columns but a different subset of rows. A table split up in this manner is also known as a sharded table. In an SDB, each participant node can be a leader for one subset of data and a follower for other subsets of data.

In the context of a replicated DBMS, such as an SDB, the Raft consensus protocol handles leader election, log replication, and Raft group membership changes with modifications to be described below. The modifications of the illustrative embodiments help to avoid term inflation and to provide stable leadership.

Term Inflation

In the Raft protocol, each node begins as a follower and remains in the follower state as long as it receives valid RPCs from a leader or candidate. Leaders send periodic heartbeats (i.e., AppendEntries RPCs that carry no log entries) to all followers to maintain authority. If a follower receives no communication over a period of time, then it assumes there is no viable leader and begins an election to choose a new leader, thus converting to candidate and voting for itself. On conversion to candidate, a node increments its currentTerm value, votes for itself, resets an election timer, and sends a RequestVote RPC to all the other participant nodes. If the candidate receives a majority of votes from the participant nodes, then the candidate converts to leader. If an AppendEntries RPC is received from another node, then the candidate converts to follower. If the election timeout elapses, then the candidate starts a new election.

Each time a candidate initiates an election, the candidate increments its currentTerm value, because a follower cannot establish itself as a leader for the previous term. This can lead to term inflation due to frequent unsuccessful (i.e., unnecessary) elections because of intermittent network communication, temporary heartbeat loss, or peers starting up in a short period of time. The term value is a global parameter, and when multiple nodes attempt to increment term in vote requests, this leads to contention on a global parameter. To address this term inflation, the illustrative embodiments introduce a futureTerm value, which is increased by a candidate at the start of an election rather than increasing the currentTerm value. The candidate node votes for itself, resets the election timer, and sends a RequestVote RPC with an inputTerm argument set to the futureTerm value to the other nodes.

The RequestVote RPC includes the futureTerm value as the inputTerm argument, a candidate ID, a last log index, and a last log term as arguments. A receiving node compares the inputTerm value to its own current term. If the inputTerm value (the candidate node's futureTerm) is less than the receiving node's currentTerm, then the receiving node does not grant the vote, thus returning false for voteGranted. This use of futureTerm avoids term inflation, especially when there is a higher chance of race conditions in leader elections. A candidate can continue increasing futureTerm multiple times during race conditions without advancing the currentTerm, and hence the term, which instead is only incremented if a candidate wins an election.

In some embodiments, each node can have a different increment for futureTerm. This helps solve any live lock problems. For example, if two candidates start voting and there is a high and variable network execution cost that is not related to latency, both candidates may vote for themselves. In the Raft protocol, each candidate backs off, increments its currentTerm by 1, and starts an election with a randomized timeout. Both candidates might vote for themselves again in the next term. With futureTerm being incremented by different increment values, the election process will converge more quickly to select a leader. In one embodiment, the futureTerm value is discarded (reset to zero) and the currentTerm is incremented once a leader is elected; therefore, this avoids term inflation. The increment for a node can also be used to give priority to certain nodes: the higher the increment value, the higher the priority.

In one embodiment, a given node, upon converting to candidate, sets its futureTerm value as follows:

futureTerm=max(term, futureTerm)+increment, where increment is an increment value for the given node. This ensures that the futureTerm value always advances the term and allows for an increment other than 1, e.g., 2, 3, etc. While the futureTerm value may increment beyond the term value by more than 1, this is only for the purposes of establishing a leader in this embodiment. Once a leader is elected, the currentTerm value is incremented by 1 and the futureTerm value is optionally reset to zero. In subsequent AppendEntries RPCs, the new leader includes a term argument set to the incremented currentTerm value, which results in the other nodes updating their currentTerm values. Thus, futureTerm does not add to term inflation, because the actual currentTerm value (and term argument of subsequent RPCs) only increments by 1 when there is a successful leadership change and does not increment when there is an unsuccessful (i.e., unnecessary) election.

Non-Disruptive Vote Request

In a replicated database, there may be unpredictable issues, such as intermittent network communication, delay in error detection, deviation in resource scheduling in the database/operating system. These issues can lead to reelections that result in unnecessary failovers, impacting user workload and replication efficiency. The illustrative embodiments introduce an election type such that vote requests of different election types are treated differently by the participant nodes in a Raft group. One election type is a non-disruptive vote request. Any established leader and followers automatically reject a non-disruptive vote request. This is used at Raft group startup time to avoid race conditions. For example, after database startup in a replicated database, a new node (e.g., shard or database server) may immediately kick in election before an already established leader manages to connect to the new node and convert the new node to follower.

A candidate node determines whether a predetermined amount of time (i.e., a startup timeout) has passed since the Raft group startup time is less than a startup timeout value. If the predetermined startup timeout has not expired, the candidate node sets the election type to non-disruptive and includes the election type as an argument in a RequestVote RPC. If there is an established leader and/or follower, the vote is automatically rejected, thus preventing an unnecessary leadership change and advancement of the term value. The candidate node will eventually receive an AppendEntries RPC (with or without log entries) from the leader and convert to follower.

Heartbeat Loss Vote Request

In cases where a node initiates an election as a result of the election timeout expiring without receiving a heartbeat from a leader, the vote request is rejected by a leader or any other follower if its own election timeout has not expired. In other words, if a follower node has just received a heartbeat and there is another node that requests leadership, then the follower node rejects the request on the premise of being a party of established consensus. It is possible that a connection issue will affect more than one follower and there will no longer be established consensus. For example, if there are five nodes (A (leader), B, C, D, E) and only node B is receiving a heartbeat from node A (the leader), then nodes C, D, and E can agree on a leader among themselves as they are the majority. Node A can continue to behave as the leader for some time and replicate the logs to node B. Because node A cannot get consensus for its replicated logs, those replicated logs will be discarded when A or B discovers a new leader, as decided by nodes C, D, and E.

In the case of a heartbeat loss vote request, the candidate sets the election type to default, as failure of the leader is the most common reason for leadership change. In response to a vote request with a default election type, each non-candidate node compares the time of last sent (for leader) or received (for follower) heartbeat with the current time to determine an amount of time that has passed since the last heartbeat. If the difference is less than a predetermined heartbeat timeout, then the non-candidate node rejects the vote request (replies false for voteGranted). In this case, since there is an established leader, the candidate node will eventually receive an AppendEntries RPC (with or without log entries) from the leader and convert to follower. In one embodiment, the heartbeat timeout is a percentage of the election timeout (e.g., between 80% and 100% ($80 \leq x < 100$)). If, however, the difference is greater than or equal to the heartbeat timeout, the receiving node may grant the vote if the candidate's log is up to date.

Mandatory Vote Request

In a replicated database, there may be times when the database system must force a leadership change. This is a switch-over rather than a failover. For example, when one or more nodes are added to the replicated database system or when the database system is experiencing workload issues, the database system may wish to change the database server that is the leader for a given portion of the database. However, in the Raft consensus protocol, the leader will always be ahead of the followers, and a candidate will never have the most advanced logs to become leader. Furthermore, the leader may have connection sessions with clients that have transactions that have not been committed. Thus, the illustrative embodiments provide a mechanism for preventing the leader from continuing to accept new transactions, allowing the leader to commit pending transactions, and allowing the candidate to bring its log up to date.

In accordance with an illustrative embodiment, the candidate node sets the election type to mandatory for a manual leadership transition or load balancing to make sure the leader does not accept new transactions during a leadership change. A mandatory vote request informs the leader that it should stop requesting new workload. Thus, in response to a leader receiving a RequestVote RPC with an election type of mandatory, the leader node disables new transaction acceptance. Once the vote-requesting node receives all Raft log records from the previous leader, the leadership transition occurs.

Handling of Mandatory Election by Client

In the case of a mandatory vote request, the leader will disable new transaction acceptance. From the perspective of the client, a new transaction will result in an error being returned by the leader node. There may be three types of request the client will attempt: (a) there is an ongoing transaction in a session between the client and the leader, (b) the client attempts to start a transaction on an existing session with the leader, or (c) the client attempts to establish a session with the leader. In situation (a) above, the leader will continue processing the transaction. The transaction will be either completed and committed or rolled back. In situation (b), the leader will return an error, and the client will wait a period of time before attempting to start the transaction. This will provide some time for the candidate to bring its logs up to date and establish itself as the leader. The error is also handled by the connection pool. When the client attempts to start the transaction after receiving the error and waiting the period of time, the client will establish a new session with the new leader if the leadership transition is completed. In situation (c), the client will attempt to establish a new session with the new leader and start the transaction.

Pseudocode

Details for the key technical improvements for the illustrative embodiments may be described using pseudo-code as follows (improvements over Raft in bold):

---

Candidates:
* On conversion to candidate, start election:
* ~~Increment currentTerm~~
* Set futureTerm = max(currentTerm, futureTerm) + <increment>, e.g., 1, 3
* Vote for self
* Reset election timer
* Set election type
   * if (current time − database startup time < {startup timeout})
      * election type = NonDisruptive
   * if (mandatory conversion to candidate)
      * election type = Mandatory
   * Else election type = Default
* Send RequestVote RPCs to all other servers
* If votes received from majority of servers until new vote started: become leader, increment the currentTerm, set futureTerm to 0
* If AppendEntries RPC received from new leader: convert to follower
* If election timeout elapses: start new election The RequestVote RPC is invoked by candidates to gather votes.
Arguments:
    inputTerm    candidate's futureTerm
    candidateId    candidate requesting vote
    lastLogIndex    index of candidate's last log entry
    lastLogTerm    term of candidate's last log entry
    electionType    Type of election: non-disruptive, default, mandatory
Results:
    term currentTerm,    for candidate to update itself
    voteGranted true    means candidate received vote
Receiver implementation:
1. Reply false if inputTerm < currentTerm
2. Check election type:
If election is Mandatory and receiver is the leader, disable new transaction acceptance
else
If electon is NonDisruptive and receiver is the leader reply false
If election is not Mandatory and receiver is non-candidate (i.e., leader or follower), we compare the time of last sent/received heartbeat with current time. If the difference is less than x% of election timeout (80<=x<100), we reply false
3. Let local_term=max(currentTerm, futureTerm). If local_term>inputTerm reply false, otherwise update futureTerm to inputTerm (see 2<sup>nd</sup> bullet in Candidates above)
4. If votedFor is null or candidateId, and candidate's log is at least as up-to-date as receiver's log, grant vote and Turn off Acknowledgment until a) AppendEntries RPC arrives from new leader or b) timeout is passed.
5. set next election timeout to x seconds from now

---

Procedural Overview

Figure 2:
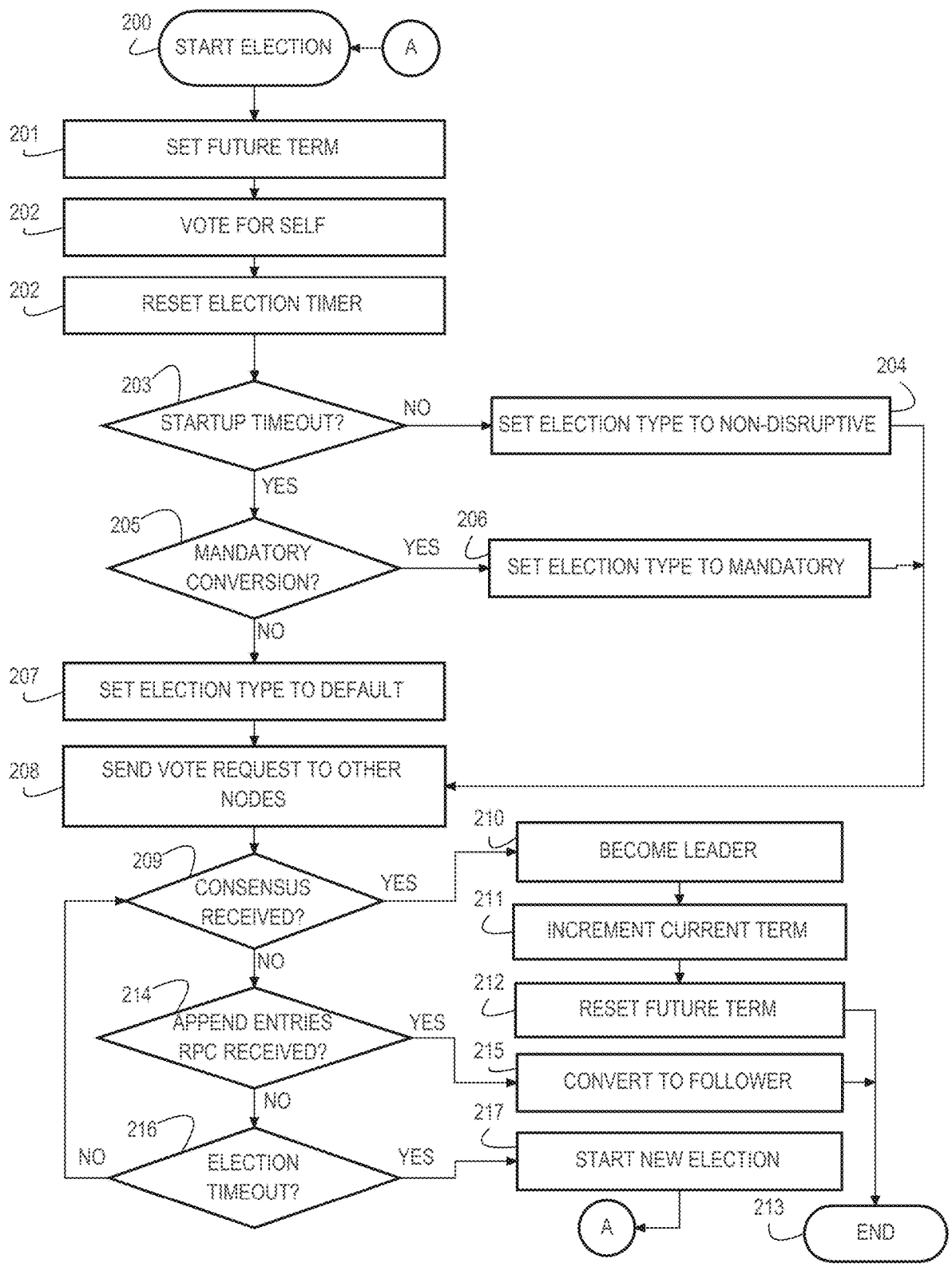
FIG. 2 depicts a flowchart illustrating the operation of a candidate node starting an election in accordance with an illustrative embodiment.

FIG. 2 depicts a flowchart illustrating the operation of a candidate node starting an election in accordance with an illustrative embodiment. Operation begins upon conversion by a node in a consensus protocol group converting to candidate and starting an election (block 200). The candidate node sets a future leadership term value (referred to as futureTerm above) (block 201), votes for itself (block 202), and resets the election timer (block 202). Unlike the existing Raft consensus protocol, the candidate node does not increment its currentTerm value at the start of the election. Rather, the candidate node sets a future term value, which is used for an input argument for the vote request (i.e., the RequestVote RPC). The input term argument does not set a new term; the input term argument serves as a candidate term that can be granted or rejected by each receiving node. In one embodiment, the candidate node sets the future term as follows:

$$futureTerm = max(currentTerm, futureTerm) + <increment>,$$

where the increment is an integer (e.g., 1, 2, 3, etc.) set for each participant node. The increment value can be used to give priority to a given node where the higher the increment value, the higher the priority.

The candidate node then determines whether a startup timeout has expired (block 203). In one embodiment, the candidate node may determine whether the startup timeout has expired (current time−group startup time≥{startup timeout}). If the startup timeout has not expired (block 203: NO), then the candidate node sets the election type to non-disruptive (block 204), and operation proceeds to block 208, described below. If the startup timeout has expired (block 203: YES), then the candidate node determines whether the node has converted to candidate because of a mandatory conversion (block 205). If the node has converted to candidate because of a mandatory conversion (block 205: YES), then the candidate node sets the election type to mandatory (block 206), and operation proceeds to block 208. If the node has not converted to candidate because of a mandatory conversion (block 205: NO), then the candidate node sets the election type to default (block 207). Thereafter, the candidate node sends the vote request to the other participant nodes in the group until a new vote is started (block 208). The vote request includes the input term as an argument set to the future term value.

The candidate node determines whether a consensus is received from the other participant nodes (block 209). If a consensus is received (block 209: YES), then the candidate node becomes leader (block 210) increments its current term (block 211), and resets the future term value (block 212). Thereafter, operation ends (block 213). In one embodiment, the candidate node resets the future term value to zero. In an alternative embodiment, the candidate node does not reset the future term value. Because the future term is only used during elections and does not affect advancement of the current term, the future term can be any value greater than the candidate's current term. Therefore, inflation in the future term does not raise a significant issue.

If the candidate node does not receive consensus (block 209: NO), then the candidate node determines whether an append entries RPC is received from a leader node (block 214). In one embodiment, the append entries RPC may be received from a new leader. If the candidate node receives an append entries RPC (block 214: YES), then the candidate node converts to follower (block 215), and operation ends.

If the candidate node does not receive an append entries RPC (block 214: NO), then the candidate node determines whether the election timeout has expired (block 216). If the election timeout has not expired (block 216: NO), then operation returns to block 209 to determine whether a consensus is received, and operation repeats until a consensus is received, an append entries RPC is received from a new leader, or the election timeout expires. If the election timeout expires (block 216: YES), then the candidate node starts a new election (block 217), and operation returns to block 200 for the new election.

Figure 3A:
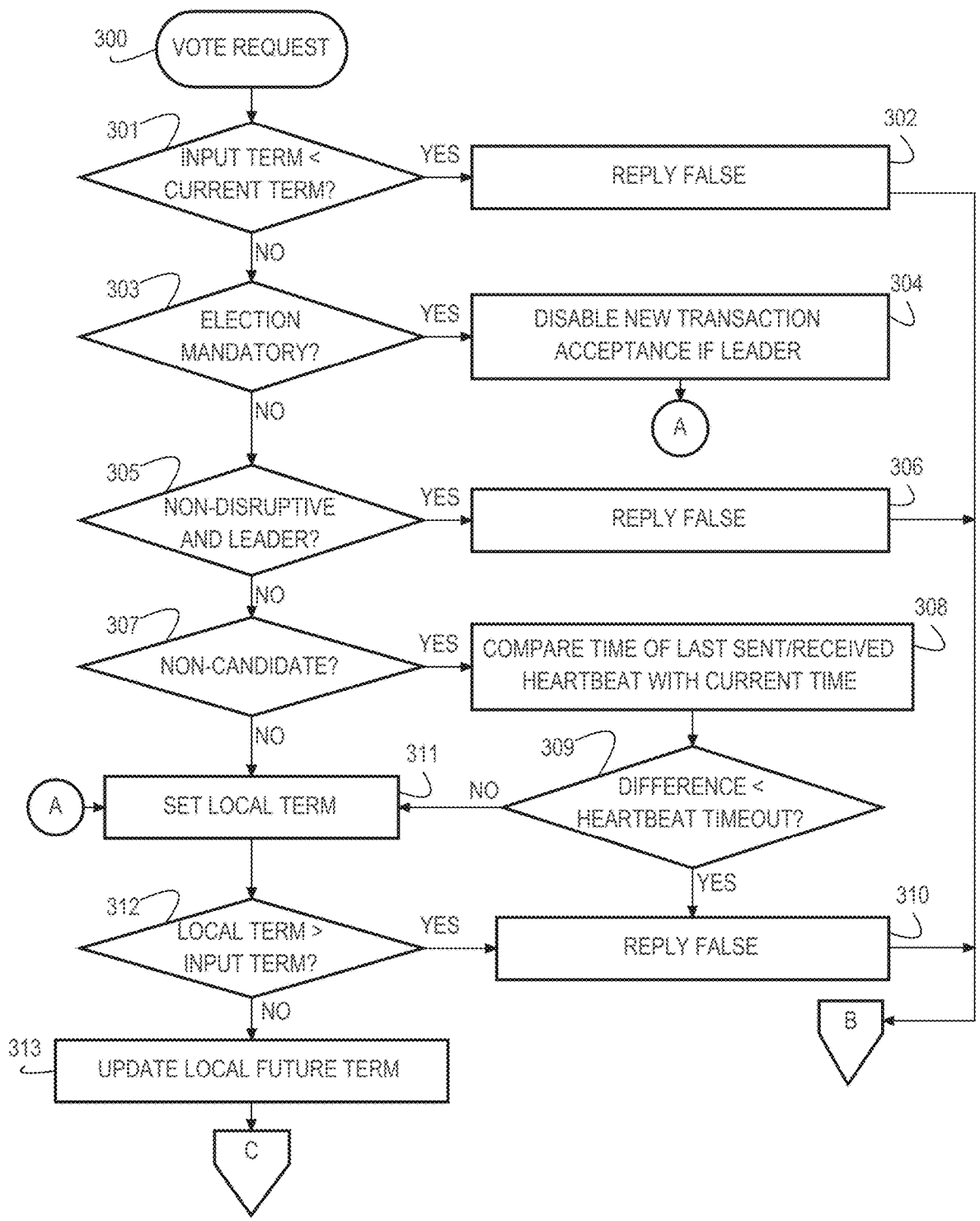
FIGS. 3A and 3B depict a flowchart illustrating the operation of a receiving node processing a vote request in accordance with an illustrative embodiment.
Figure 3B:
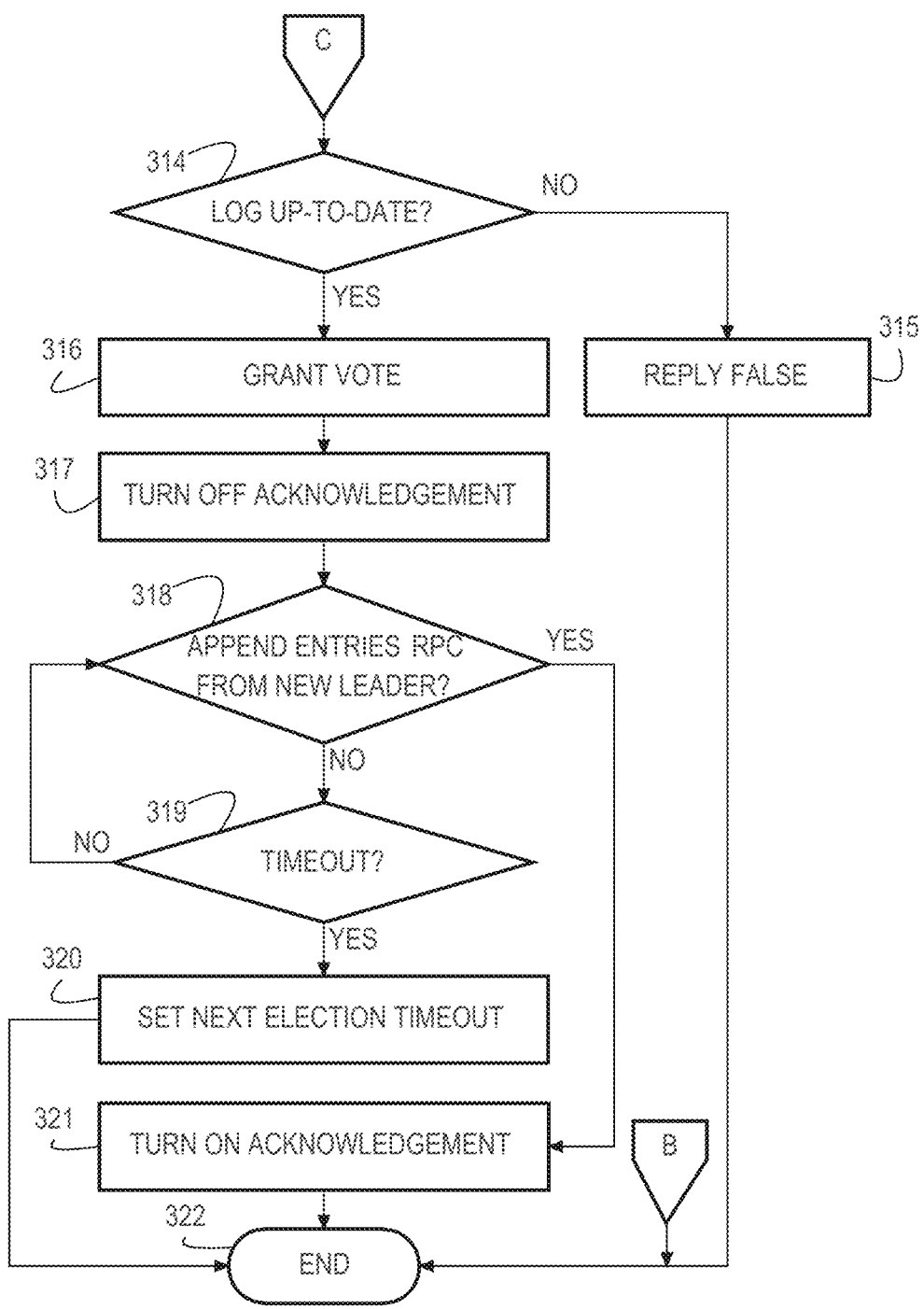

FIGS. 3A and 3B depict a flowchart illustrating the operation of a receiving node processing a vote request in accordance with an illustrative embodiment. With reference to FIG. 3A, operation begins upon receiving a vote request from a candidate node (block 300). The receiving node determines whether the input term of the vote request is less than the current term of the receiving node (block 301). The input term of the vote request is set to the future term of the candidate node. The future term must advance the term and, thus, the current term of each participant node. If the input term is less than the receiving node's current term (block 301: YES), then the receiving node replies false (for voteGranted), thus rejecting the vote (block 302). Then, operation ends (block 322 in FIG. 3B).

If the input term is not less than the receiving node's current term (block 301: NO), then the receiving node determines whether the election type is mandatory (block 303). If the election type is mandatory (block 303: YES), then the receiving node disables new transaction acceptance if the receiving node is the leader (block 304). Then, operation proceeds to block 311, which is described below.

If the election type is not mandatory (block 303: NO), then the receiving node determines whether the election type is non-disruptive and the receiving node is the leader (block 305). If the election type is non-disruptive and the receiving node is the leader (block 305: YES), then the receiving node replies false, thus rejecting the vote (block 306). Then, operation ends (block 322 in FIG. 3B).

If the election type is default or the receiving node is not the leader (block 305: NO), then the receiving node determines whether the receiving node is a non-candidate node (i.e., leader or follower) (block 307). If the receiving node is a non-candidate (block 307: YES), then the receiving node compares a time of the last sent (for leader) or received (follower) heartbeat with the current time (block 308). The receiving node determines whether a difference between the last heartbeat and the current time (i.e., an amount of time that has passed since the last heartbeat was sent/received) is less than a heartbeat timeout (block 309). In one embodiment, the heartbeat timeout is a percentage, X %, of the election timeout (e.g., $80 \leq X < 100$). If the difference is less than the heartbeat timeout (block 309: YES), then the receiving node replies false, thus rejecting the vote (block 310). Then, operation ends (block 322 in FIG. 3B). If the amount of time that has passed since the last heartbeat was sent/received is not less than the heartbeat timeout (block 309: NO), then operation proceeds to block 311.

The receiving node then sets a local term value (block 311). In one embodiment, the receiving node sets the local term as follows:

local_term=max(currentTerm, futureTerm)

The receiving node then determines whether the local term is greater than the input term value (block 312). The receiving node may have its own future term value if the receiving node has also requested a vote. Thus, block 312 compares the receiving node's future term value, if it is non-zero, with input term, which is set to the candidate node's future term value. If the local term is greater than the input term value (block 312: YES), then the receiving node replies false, thus rejecting the vote (block 310). Then, operation proceeds to block 321 in FIG. 3B. If the local term is not greater than the input term (block 312: NO), then the receiving node updates the local future term to the input term (block 313).

Turning to FIG. 3B, the receiving node determines whether votedFor is null or candidateID and the candidate's log is up-to-date (block 314). If the candidate's log is not up-to-date (block 314: NO), then the receiving node replies false, thus rejecting the vote (block 315). Then, operation ends (block 322).

If the candidate's log is up-to-date (block 314: YES), then the receiving node grants the vote (i.e., returns true for voteGranted) (block 316). The receiving node then turns off acknowledgement to the old leader (bock 317) and determines whether an append entries RPC is received from a new leader (block 318). If an append entries RPC from a new leader is not received (block 318: NO), then the receiving node determines whether the election timeout expires (block 319). If the election timeout does not expire (block 319: NO), then operation returns to block 318 and repeats until an append entries RPC is received from a new leader or the election timeout expires. If the election timeout expires (block 319: YES), then the receiving node sets the next election timeout (block 320). Thereafter, operation ends (block 322). If an append entries RPC is received from a new leader (block 318: YES), the receiving node turns on acknowledgement (block 321), and operation ends (block 322).

DBMS Overview

A database management system (DBMS) manages a database. A DBMS may comprise one or more database servers. A database comprises database data and a database dictionary that are stored on a persistent memory mechanism, such as a set of hard disks. Database data may be stored in one or more collections of records. The data within each record is organized into one or more attributes. In relational DBMSs, the collections are referred to as tables (or data frames), the records are referred to as records, and the attributes are referred to as attributes. In a document DBMS ("DOCS"), a collection of records is a collection of documents, each of which may be a data object marked up in a hierarchical-markup language, such as a JSON object or XML document. The attributes are referred to as JSON fields or XML elements. A relational DBMS may also store hierarchically marked data objects; however, the hierarchically marked data objects are contained in an attribute of record, such as JSON typed attribute.

Users interact with a database server of a DBMS by submitting to the database server commands that cause the database server to perform operations on data stored in a database. A user may be one or more applications running on a client computer that interacts with a database server. Multiple users may also be referred to herein collectively as a user.

A database command may be in the form of a database statement that conforms to a database language. A database language for expressing the database commands is the Structured Query Language (SQL). There are many different versions of SQL; some versions are standard and some proprietary, and there are a variety of extensions. Data definition language ("DDL") commands are issued to a database server to create or configure data objects referred to herein as database objects, such as tables, views, or complex data types. SQL/XML is a common extension of SQL used when manipulating XML data in an object-relational database. Another database language for expressing database commands is Spark™ SQL, which uses a syntax based on function or method invocations.

In a DOCS, a database command may be in the form of functions or object method calls that invoke CRUD (Create Read Update Delete) operations. An example of an API for such functions and method calls is MQL (MondoDB™ Query Language). In a DOCS, database objects include a collection of documents, a document, a view, or fields defined by a JSON schema for a collection. A view may be created by invoking a function provided by the DBMS for creating views in a database.

Changes to a database in a DBMS are made using transaction processing. A database transaction is a set of operations that change database data. In a DBMS, a database transaction is initiated in response to a database command requesting a change, such as a DML command requesting an update, insert of a record, or a delete of a record or a CRUD object method invocation requesting to create, update or delete a document. DML commands and DDL specify changes to data, such as INSERT and UPDATE statements. A DML statement or command does not refer to a statement or command that merely queries database data. Committing a transaction refers to making the changes for a transaction permanent.

Under transaction processing, all the changes for a transaction are made atomically. When a transaction is committed, either all changes are committed, or the transaction is rolled back. These changes are recorded in change records, which may include redo records and undo records. Redo records may be used to reapply changes made to a data block. Undo records are used to reverse or undo changes made to a data block by a transaction.

An example of such transactional metadata includes change records that record changes made by transactions to database data. Another example of transactional metadata is embedded transactional metadata stored within the database data, the embedded transactional metadata describing transactions that changed the database data.

Undo records are used to provide transactional consistency by performing operations referred to herein as consistency operations. Each undo record is associated with a logical time. An example of logical time is a system change number (SCN). An SCN may be maintained using a Lamporting mechanism, for example. For data blocks that are read to compute a database command, a DBMS applies the needed undo records to copies of the data blocks to bring the copies to a state consistent with the snap-shot time of the query. The DBMS determines which undo records to apply to a data block based on the respective logical times associated with the undo records.

In a distributed transaction, multiple DBMSs commit a distributed transaction using a two-phase commit approach. Each DBMS executes a local transaction in a branch transaction of the distributed transaction. One DBMS, the coordinating DBMS, is responsible for coordinating the commitment of the transaction on one or more other database systems. The other DBMSs are referred to herein as participating DBMSs.

A two-phase commit involves two phases, the prepare-to-commit phase, and the commit phase. In the prepare-to-commit phase, branch transaction is prepared in each of the participating database systems. When a branch transaction is prepared on a DBMS, the database is in a "prepared state" such that it can guarantee that modifications executed as part of a branch transaction to the database data can be committed. This guarantee may entail storing change records for the branch transaction persistently. A participating DBMS acknowledges when it has completed the prepare-to-commit phase and has entered a prepared state for the respective branch transaction of the participating DBMS.

In the commit phase, the coordinating database system commits the transaction on the coordinating database system and on the participating database systems. Specifically, the coordinating database system sends messages to the participants requesting that the participants commit the modifications specified by the transaction to data on the participating database systems. The participating database systems and the coordinating database system then commit the transaction.

On the other hand, if a participating database system is unable to prepare or the coordinating database system is unable to commit, then at least one of the database systems is unable to make the changes specified by the transaction. In this case, all of the modifications at each of the participants and the coordinating database system are retracted, restoring each database system to its state prior to the changes.

A client may issue a series of requests, such as requests for execution of queries, to a DBMS by establishing a database session. A database session comprises a particular connection established for a client to a database server through which the client may issue a series of requests. A database session process executes within a database session and processes requests issued by the client through the database session. The database session may generate an execution plan for a query issued by the database session client and marshal slave processes for execution of the execution plan.

The database server may maintain session state data about a database session. The session state data reflects the current state of the session and may contain the identity of the user for which the session is established, services used by the user, instances of object types, language and character set data, statistics about resource usage for the session, temporary variable values generated by processes executing software within the session, storage for cursors, variables, and other information.

A database server includes multiple database processes. Database processes run under the control of the database server (i.e., can be created or terminated by the database server) and perform various database server functions. Database processes include processes running within a database session established for a client.

A database process is a unit of execution. A database process can be a computer system process or thread or a user-defined execution context such as a user thread or fiber. Database processes may also include "database server system" processes that provide services and/or perform functions on behalf of the entire database server. Such database server system processes include listeners, garbage collectors, log writers, and recovery processes.

A multi-node database management system is made up of interconnected computing nodes ("nodes"), each running a database server that shares access to the same database. Typically, the nodes are interconnected via a network and share access, in varying degrees, to shared storage, e.g., shared access to a set of disk drives and data blocks stored thereon. The nodes in a multi-node database system may be in the form of a group of computers (e.g., work stations, personal computers) that are interconnected via a network. Alternately, the nodes may be the nodes of a grid, which is composed of nodes in the form of server blades interconnected with other server blades on a rack.

Each node in a multi-node database system hosts a database server. A server, such as a database server, is a combination of integrated software components and an allocation of computational resources, such as memory, a node, and processes on the node for executing the integrated software components on a processor, the combination of the software and computational resources being dedicated to performing a particular function on behalf of one or more clients.

Resources from multiple nodes in a multi-node database system can be allocated to running a particular database server's software. Each combination of the software and allocation of resources from a node is a server that is referred to herein as a "server instance" or "instance." A database server may comprise multiple database instances, some or all of which are running on separate computers, including separate server blades.

A database dictionary may comprise multiple data structures that store database metadata. A database dictionary may, for example, comprise multiple files and tables. Portions of the data structures may be cached in main memory of a database server.

When a database object is said to be defined by a database dictionary, the database dictionary contains metadata that defines properties of the database object. For example, metadata in a database dictionary defining a database table may specify the attribute names and data types of the attributes, and one or more files or portions thereof that store data for the table. Metadata in the database dictionary defining a procedure may specify a name of the procedure, the procedure's arguments and the return data type, and the data types of the arguments, and may include source code and a compiled version thereof.

A database object may be defined by the database dictionary, but the metadata in the database dictionary itself may only partly specify the properties of the database object. Other properties may be defined by data structures that may not be considered part of the database dictionary. For example, a user-defined function implemented in a JAVA class may be defined in part by the database dictionary by specifying the name of the user-defined function and by specifying a reference to a file containing the source code of the Java class (i.e., .java file) and the compiled version of the class (i.e., .class file).

A database object may have an attribute that is a primary key. A primary key contains primary key values. A primary key value uniquely identifies a record among the records in the database object. For example, a database table may include a column that is a primary key. Each row in the database table holds a primary key value that uniquely identifies the row among the rows in the database table.

A database object may have an attribute that is a foreign key of a primary key of another database object. A foreign key of a primary key contains primary key values of the primary key. Thus, a foreign key value in the foreign key uniquely identifies a record in the respective database object of the primary key.

A foreign key constraint based on a primary key may be defined for a foreign key. A DBMS ensures that any value in the foreign key exists in the primary key. A foreign key need not be defined for a foreign key. Instead, a foreign key relationship may be defined for the foreign key. Applications that populate the foreign key are configured to ensure that foreign key values in the foreign key exist in the respective primary. An application may maintain a foreign key in this way even when no foreign relationship is defined for the foreign key.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 4:
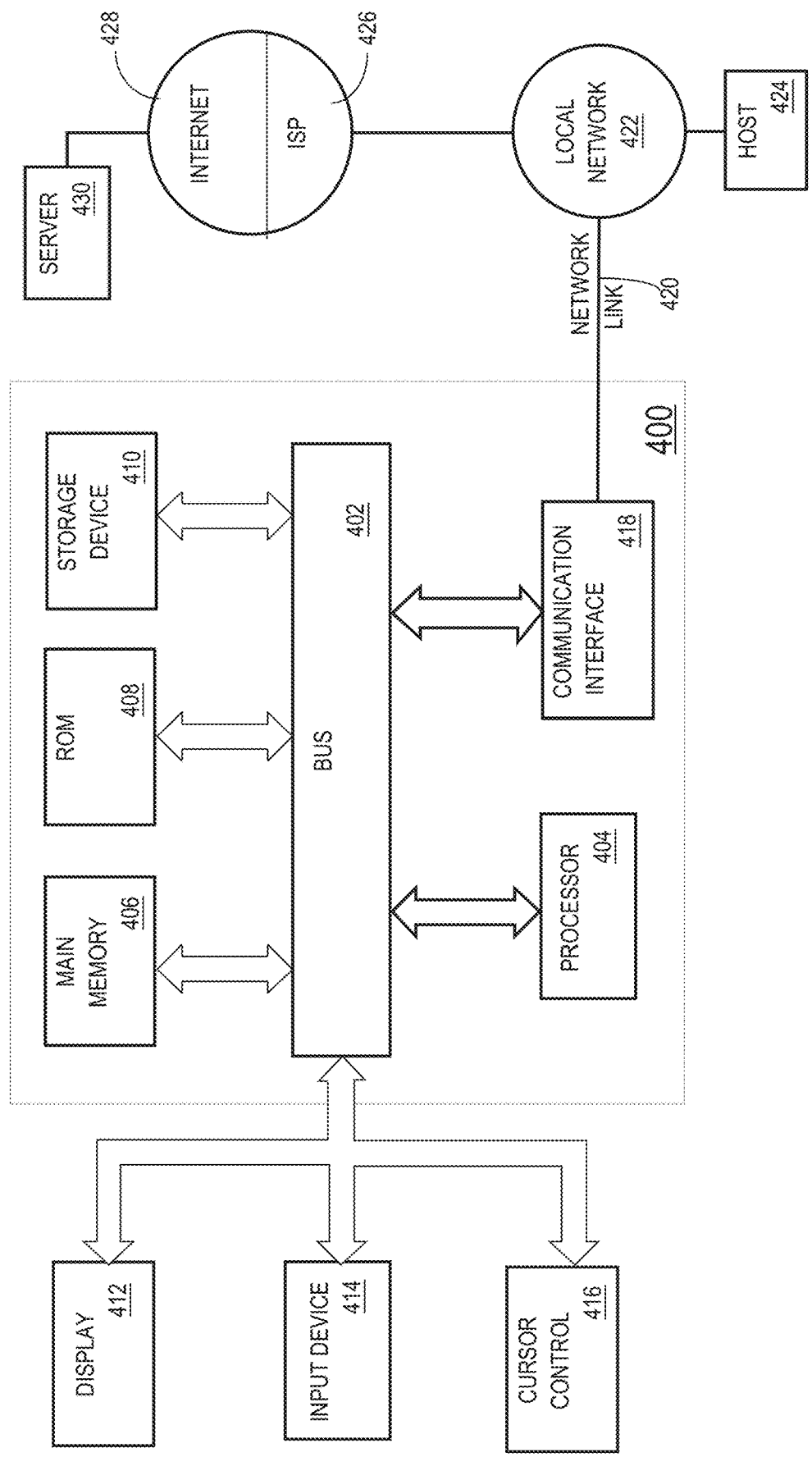
FIG. 4 is a block diagram that illustrates a computer system 400 upon which an embodiment of the invention may be implemented.

For example, FIG. 4 is a block diagram that illustrates a computer system 400 upon which an embodiment of the invention may be implemented. Computer system 400 includes a bus 402 or other communication mechanism for communicating information, and a hardware processor 404 coupled with bus 402 for processing information. Hardware processor 404 may be, for example, a general purpose microprocessor.

Computer system 400 also includes a main memory 406, such as a random access memory (RAM) or other dynamic storage device, coupled to bus 402 for storing information and instructions to be executed by processor 404. Main memory 406 also may be used for storing temporary variables or other intermediate information during execution of instructions to be executed by processor 404. Such instructions, when stored in non-transitory storage media accessible to processor 404, render computer system 400 into a special-purpose machine that is customized to perform the operations specified in the instructions.

Computer system 400 further includes a read only memory (ROM) 408 or other static storage device coupled to bus 402 for storing static information and instructions for processor 404. A storage device 410, such as a magnetic disk, optical disk, or solid-state drive is provided and coupled to bus 402 for storing information and instructions.

Computer system 400 may be coupled via bus 402 to a display 412, such as a cathode ray tube (CRT), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

Computer system 400 may implement the techniques described herein using customized hard-wired logic, one or more ASICs or FPGAs, firmware and/or program logic which in combination with the computer system causes or programs computer system 400 to be a special-purpose machine. According to one embodiment, the techniques herein are performed by computer system 400 in response to processor 404 executing one or more sequences of one or more instructions contained in main memory 406. Such instructions may be read into main memory 406 from another storage medium, such as storage device 410. Execution of the sequences of instructions contained in main memory 406 causes processor 404 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 410. Volatile media includes dynamic memory, such as main memory 406. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 402. Transmission media can also take the form of acoustic or light waves, such as those generated during radio-wave and infra-red data communications.

Various forms of media may be involved in carrying one or more sequences of one or more instructions to processor 404 for execution. For example, the instructions may initially be carried on a magnetic disk or solid-state drive of a remote computer. The remote computer can load the instructions into its dynamic memory and send the instructions over a telephone line using a modem. A modem local to computer system 400 can receive the data on the telephone line and use an infra-red transmitter to convert the data to an infra-red signal. An infra-red detector can receive the data carried in the infra-red signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card, cable modem, satellite modem, or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the world wide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are example forms of transmission media.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418.

The received code may be executed by processor 404 as it is received, and/or stored in storage device 410, or other non-volatile storage for later execution.

Software Overview

Figure 5:
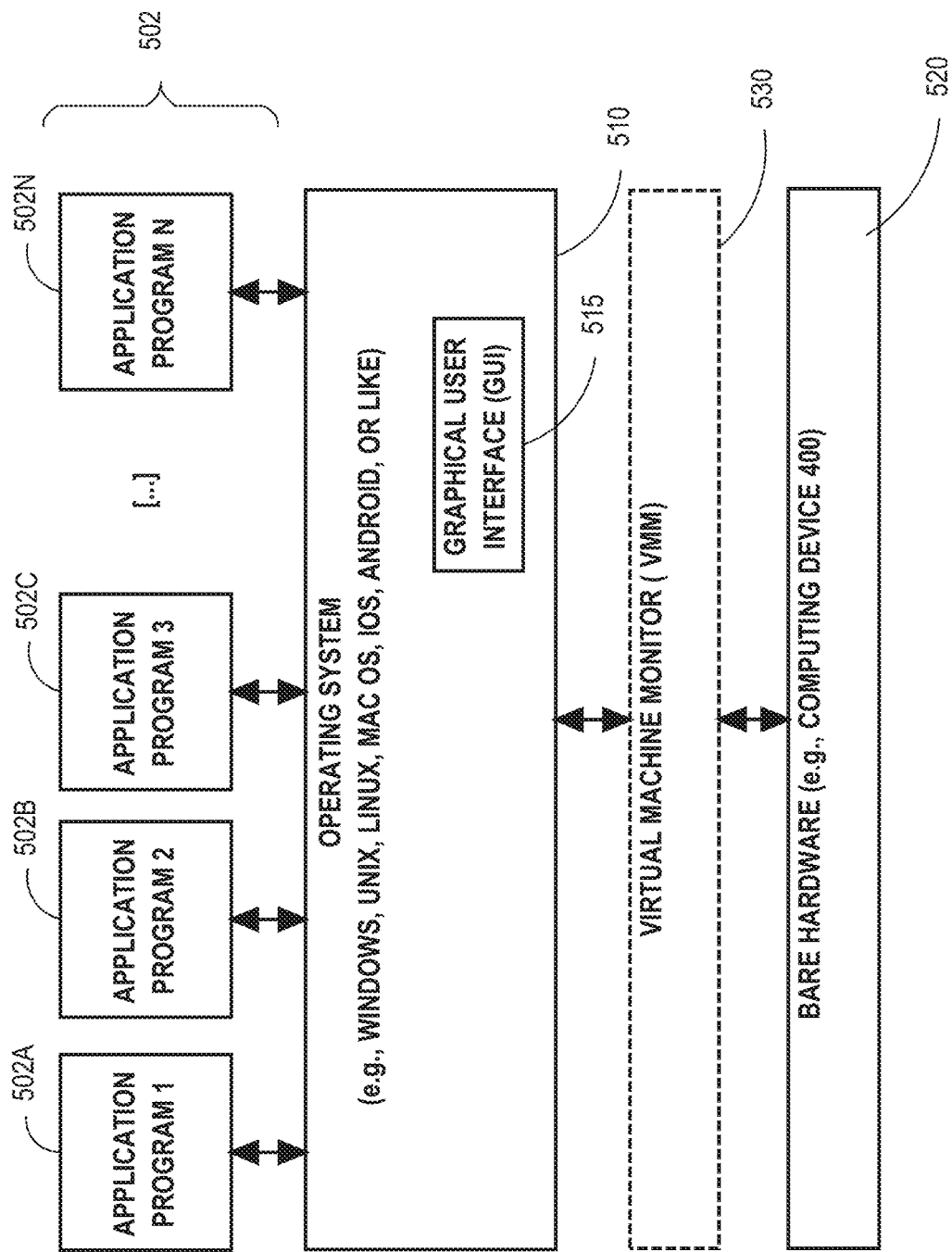
FIG. 5 is a block diagram of a basic software system that may be employed for controlling the operation of a computer system.

FIG. 5 is a block diagram of a basic software system 500 that may be employed for controlling the operation of computer system 500. Software system 500 and its components, including their connections, relationships, and functions, is meant to be exemplary only, and not meant to limit implementations of the example embodiment(s). Other software systems suitable for implementing the example embodiment(s) may have different components, including components with different connections, relationships, and functions.

Software system 500 is provided for directing the operation of computer system 400. Software system 500, which may be stored in system memory (RAM) 406 and on fixed storage (e.g., hard disk or flash memory) 410, includes a kernel or operating system (OS) 510.

The OS 510 manages low-level aspects of computer operation, including managing execution of processes, memory allocation, file input and output (I/O), and device I/O. One or more application programs, represented as 502A, 502B, 502C . . . 502N, may be "loaded" (e.g., transferred from fixed storage 410 into memory 406) for execution by the system 500. The applications or other software intended for use on computer system 400 may also be stored as a set of downloadable computer-executable instructions, for example, for downloading and installation from an Internet location (e.g., a Web server, an app store, or other online service).

Software system 500 includes a graphical user interface (GUI) 515, for receiving user commands and data in a graphical (e.g., "point-and-click" or "touch gesture") fashion. These inputs, in turn, may be acted upon by the system 500 in accordance with instructions from operating system 510 and/or application(s) 502. The GUI 515 also serves to display the results of operation from the OS 510 and application(s) 502, whereupon the user may supply additional inputs or terminate the session (e.g., log off).

OS 510 can execute directly on the bare hardware 520 (e.g., processor(s) 404) of computer system 400. Alternatively, a hypervisor or virtual machine monitor (VMM) 530 may be interposed between the bare hardware 520 and the OS 510. In this configuration, VMM 530 acts as a software "cushion" or virtualization layer between the OS 510 and the bare hardware 520 of the computer system 400.

VMM 530 instantiates and runs one or more virtual machine instances ("guest machines"). Each guest machine comprises a "guest" operating system, such as OS 510, and one or more applications, such as application(s) 502, designed to execute on the guest operating system. The VMM 530 presents the guest operating systems with a virtual operating platform and manages the execution of the guest operating systems.

In some instances, the VMM 530 may allow a guest operating system to run as if it is running on the bare hardware 520 of computer system 400 directly. In these instances, the same version of the guest operating system configured to execute on the bare hardware 520 directly may also execute on VMM 530 without modification or reconfiguration. In other words, VMM 530 may provide full hardware and CPU virtualization to a guest operating system in some instances.

In other instances, a guest operating system may be specially designed or configured to execute on VMM 530 for efficiency. In these instances, the guest operating system is "aware" that it executes on a virtual machine monitor. In other words, VMM 530 may provide para-virtualization to a guest operating system in some instances.

A computer system process comprises an allotment of hardware processor time, and an allotment of memory (physical and/or virtual), the allotment of memory being for storing instructions executed by the hardware processor, for storing data generated by the hardware processor executing the instructions, and/or for storing the hardware processor state (e.g., content of registers) between allotments of the hardware processor time when the computer system process is not running. Computer system processes run under the control of an operating system and may run under the control of other programs being executed on the computer system.

Cloud Computing

The term "cloud computing" is generally used herein to describe a computing model which enables on-demand access to a shared pool of computing resources, such as computer networks, servers, software applications, and services, and which allows for rapid provisioning and release of resources with minimal management effort or service provider interaction.

A cloud computing environment (sometimes referred to as a cloud environment, or a cloud) can be implemented in a variety of different ways to best suit different requirements. For example, in a public cloud environment, the underlying computing infrastructure is owned by an organization that makes its cloud services available to other organizations or to the general public. In contrast, a private cloud environment is generally intended solely for use by, or within, a single organization. A community cloud is intended to be shared by several organizations within a community; while a hybrid cloud comprises two or more types of cloud (e.g., private, community, or public) that are bound together by data and application portability.

Generally, a cloud computing model enables some of those responsibilities which previously may have been provided by an organization's own information technology department, to instead be delivered as service layers within a cloud environment, for use by consumers (either within or external to the organization, according to the cloud's public/private nature). Depending on the particular implementation, the precise definition of components or features provided by or within each cloud service layer can vary, but common examples include: Software as a Service (SaaS), in which consumers use software applications that are running upon a cloud infrastructure, while a SaaS provider manages or controls the underlying cloud infrastructure and applications. Platform as a Service (PaaS), in which consumers can use software programming languages and development tools supported by a PaaS provider to develop, deploy, and otherwise control their own applications, while the PaaS provider manages or controls other aspects of the cloud environment (i.e., everything below the run-time execution environment). Infrastructure as a Service (IaaS), in which consumers can deploy and run arbitrary software applications, and/or provision processing, storage, networks, and other fundamental computing resources, while an IaaS provider manages or controls the underlying physical cloud infrastructure (i.e., everything below the operating system layer). Database as a Service (DBaaS) in which consumers use a database server or Database Management System that is running upon a cloud infrastructure, while a DbaaS provider manages or controls the underlying cloud infrastructure, applications, and servers, including one or more database servers.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method comprising:
    requesting, by a candidate node of a group of participant nodes, an election for leadership over appending log entries in a distributed log that comprises a respective log replica hosted by each participant node of the group of participant nodes, wherein:
        the group includes a leader node and a plurality of follower nodes, the leader node having leadership for a leadership term;
        requesting the election for leadership comprises:
            setting a future leadership term value based on a current leadership term value and an increment value of the candidate node; and
            submitting a vote request for the candidate node to be leader of the group of participant nodes;
        the vote request includes an input leadership term argument,
        the input leadership term argument is set to the future leadership term value, and
        each participant node receiving the vote request determines whether to vote for the candidate node based, at least in part, on the input leadership term argument of the vote request; and
    in response to a consensus of participant nodes of the group submitting votes for the candidate node, establishing the candidate node as the leader node and incrementing a current leadership term value of the candidate node,
    wherein the method is performed by one or more computing devices.

2. The method of claim 1, wherein requesting the election for leadership comprises setting an election type of the election to a non-disruptive type responsive to a current time minus database startup time being less than a startup timeout threshold.

3. The method of claim 2, wherein the leader node automatically rejects the election in response to the election type being set to the non-disruptive type.

4. The method of claim 1, wherein the election is rejected by a given participant node within the group of participant nodes without incrementing a current leadership term value of the given participant node.

5. The method of claim 1, wherein requesting the election for leadership comprises:
   setting an election type of the election to a mandatory type; and
   informing the leader node to stop requesting new workload.

6. The method of claim 1, wherein the election for leadership is rejected by the leader node if the leader node has sent a heartbeat within a heartbeat timeout.

7. The method of claim 1, wherein the election for leadership is rejected by a given follower node if the given follower node has received a heartbeat from the leader node within a heartbeat timeout.

8. The method of claim 1, wherein the election is decided by each given follower node based, at least in part, on a comparison of a last log index value of the candidate node and a last log index value of the given follower node.

9. The method of claim 1, wherein:
   the election is decided by each given follower node based on a comparison of a local future leadership term value of the given follower node and a value of the input leadership term argument.

10. The method of claim 1, wherein requesting the election for leadership comprises:
    resetting an election timer; and
    in response to the election timer elapsing, requesting a new election for leadership.

11. The method of claim 1, further comprising:
    in response to a given follower node being established as the leader node, converting the candidate node to a follower node.

12. The method of claim 1, further comprising:
    in response to establishing the candidate node as the leader node, resetting the future leadership term value to zero.

13. The method of claim 1, wherein setting the future leadership term value comprises adding the increment value to a maximum of a current leadership term value and the future leadership term value.

14. The method of claim 13, wherein the increment value is set based on a priority of the candidate node relative to other participant nodes in the group of participant nodes.

15. A method comprising:
    receiving, by a given node within a group of participant nodes from a candidate node within the group of participant nodes, a request for election of leadership over appending log entries in a distributed log that comprises a respective log replica hosted by each participant node of the group of participant nodes, wherein:
       the group of participant nodes includes a leader node and a plurality of follower nodes,
       the leader node has leadership for a leadership term,
       each participant node of the group of participant nodes has an associated current term value and a future leadership term value, and
       the request for election has an election type and an associated input leadership term value that is set to the future leadership term value of the candidate node; and
    rejecting the request for election responsive to determining one or more of the following:
       the election type of the request for election is a non-disruptive type and the given node is the leader node,
       a heartbeat message has been sent from the leader node within a heartbeat timeout, or
       a future leadership term value of the given node is greater than the input leadership term value,
    wherein the method is performed by one or more computing devices.

16. The method of claim 15, further comprising:
    responsive to an election type of the request for election being a mandatory type, disabling new transaction acceptance if the given node is the leader node.

17. The method of claim 15, further comprising:
    granting a vote in the election for leadership responsive to determining:
       the election type of the request for election is not a mandatory type,
       the heartbeat message has not been sent from the leader node within the heartbeat timeout,
       the future leadership term value of the given node is not greater than the input leadership term value, and
       the log replica hosted by the candidate node is up to date.

18. The method of claim 17, further comprising:
    responsive to granting the vote in the election for leadership, turning off acknowledgement to the leader node until an append entries remote procedure call is received from a new leader or an election timeout expires.

19. One or more non-transitory storage media storing one or more sequences of instructions which, when executed by one or more computing devices, cause:
    requesting, by a candidate node of a group of participant nodes, an election for leadership over appending log entries in a distributed log that comprises a respective log replica hosted by each participant node of the group of participant nodes, wherein:
       the group includes a leader node and a plurality of follower nodes, the leader node having leadership for a leadership term;
       requesting the election for leadership comprises:
          setting a future leadership term value based on a current leadership term value and an increment value of the candidate node; and
          submitting a vote request for the candidate node to be leader of the group of participant nodes;
       the vote request includes an input leadership term argument,
       the input leadership term argument is set to the future leadership term value, and
       each participant node receiving the vote request determines whether to vote for the candidate node based, at least in part, on the input leadership term argument of the vote request; and
    in response to a consensus of participant nodes of the group submitting votes for the candidate node, establishing the candidate node as the leader node and incrementing a current leadership term value of the candidate node.

20. One or more non-transitory storage media storing one or more sequences of instructions which, when executed by one or more computing devices, cause:
    receiving, by a given node within a group of participant nodes from a candidate node within the group of participant nodes, a request for election of leadership over appending log entries in a distributed log that comprises a respective log replica hosted by each participant node of the group of participant nodes, wherein:
the group of participant nodes includes a leader node and a plurality of follower nodes,
the leader node has leadership for a leadership term,
each participant node of the group of participant nodes has an associated current term value and a future leadership term value, and
the request for election has an election type and an associated input leadership term value that is set to the future leadership term value of the candidate node; and rejecting the request for election responsive to determining one or more of the following:
the election type of the request for election is a non-disruptive type and the given node is the leader node,
a heartbeat message has been sent from the leader node within a heartbeat timeout, or
a future leadership term value of the given node is greater than the input leadership term value.

* * * * *